US011904637B2

(12) United States Patent
Mori (10) Patent No.: US 11,904,637 B2
(45) Date of Patent: Feb. 20, 2024

(54) TIRE

(71) Applicant: SUMITOMO RUBBER INDUSTRIES, LTD., Hyogo (JP)

(72) Inventor: Kazuma Mori, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/112,816

(22) Filed: Feb. 22, 2023

(65) Prior Publication Data

US 2023/0278371 A1    Sep. 7, 2023

(30) Foreign Application Priority Data

Mar. 2, 2022    (JP) ................................. 2022-032017

(51) Int. Cl.
*B60C 11/12*    (2006.01)
(52) U.S. Cl.
CPC ............................... *B60C 11/1218* (2013.01)
(58) Field of Classification Search
CPC .................................................. B60C 11/1218
See application file for complete search history.

(56) References Cited

U.S. PATENT DOCUMENTS

| | | | |
|---|---|---|---|
| 6,668,886 B1 | 12/2003 | Iwamura | |
| 2005/0109438 A1* | 5/2005 | Collette | B60C 11/1218 425/46 |
| 2009/0255616 A1 | 10/2009 | Tomatsu | |
| 2012/0090750 A1* | 4/2012 | Kuwajima | B60C 11/1222 152/209.23 |
| 2013/0126062 A1* | 5/2013 | Palgen | B60C 11/1281 152/209.18 |
| 2021/0331528 A1 | 10/2021 | Close et al. | |

FOREIGN PATENT DOCUMENTS

| | | | |
|---|---|---|---|
| EP | 664230 A1 * | 7/1995 | |
| EP | 881103 A1 * | 12/1998 | |
| EP | 1533141 A1 | 5/2005 | |
| EP | 2821258 A1 | 1/2015 | |
| JP | H09-277805 A | 10/1997 | |
| JP | 2000-238513 A | 9/2000 | |
| JP | 2006-027306 A * | 2/2006 | |
| JP | 200656502 A | 3/2006 | |
| JP | 201111696 A | 1/2011 | |
| WO | 2007145603 A1 | 12/2007 | |
| WO | 2010063753 A1 | 6/2010 | |
| WO | WO-2011/120817 A1 * | 10/2011 | |

OTHER PUBLICATIONS

Machine translation for Japan 2006-027306 (Year: 2023).*
Translation for Europe 664230 (Year: 2023).*
Extended European Search Report received for EP Application No. 23152423.2, dated Aug. 1, 2023.

* cited by examiner

*Primary Examiner* — Steven D Maki
(74) *Attorney, Agent, or Firm* — Greenblum & Bernstein, P.L.C.

(57) ABSTRACT

A tread portion of a tire includes at least one land portion. The land portion includes an outer region disposed inwardly of a tread surface in a tire radial direction, an inner region disposed on an inner side in the tire radial direction, and at least one sipe. The sipe includes one outer sipe element extending in the outer region in a tire axial direction, and a plurality of inner sipe elements extending in the inner region. The inner sipe elements include a component extending in a tire circumferential direction, and is connected to the outer sipe element.

11 Claims, 8 Drawing Sheets

TIRE

CROSS REFERENCE TO RELATED APPLICATION

The present application claims priority to Japanese patent application JP 2022-032017, filed on Mar. 2, 2022, the entire content of which is incorporated herein by reference in its entirety.

BACKGROUND OF THE INVENTION

Field of the Invention

The present disclosure relates to a tire having a tread portion.

Background Art

To date, a tire in which, at an inner edge of a sipe main portion in the tire radial direction, a first inclined portion that is connected to the inner edge, and extends to the bottom of the sipe so as to be inclined toward one side relative to the center line of the sipe main portion which extends in the depth direction, and a second inclined portion that extends so as to be inclined toward the other side relative thereto are alternately disposed in the length direction of the sipe, has been suggested (for example, see Japanese Laid-Open Patent Publication No. 2000-238513).

In general, stiffness of a land portion becomes high according to a tread portion being worn. Therefore, an edge effect of the sipe becomes low, and on-ice/snow performance and wet performance are affected.

Meanwhile, in the tire disclosed in Japanese Laid-Open Patent Publication No. 2000-238513, stiffness of the land portion in the tire circumferential direction is inhibited from becoming high by adopting the sipe having the above-described structure. As a result, even if wear of the tread portion progresses, the edge effect is maintained at the end edge of a block and a sipe during acceleration/deceleration in straight running, and degradation of on-ice/snow performance and wet performance is expected to be inhibited.

However, the sipe disclosed in Japanese Laid-Open Patent Publication No. 2000-238513 does not include a component extending in the tire circumferential direction (see FIGS. 1, 2, and the like). Accordingly, stiffness of the land portion in the tire axial direction cannot be inhibited from becoming high according to the tread portion being worn. Therefore, the edge effect of an end edge of a block during cornering becomes low according to progress of wear of the tread portion. Furthermore, the edge effect of the sipe itself cannot be expected, so that on-ice/snow performance and wet performance during cornering are degraded.

The present disclosure has been made in view of the aforementioned circumstances, and a main object of the present disclosure is to provide a tire capable of maintaining excellent cornering performance on an ice/snow road surface and a wet road surface even if wear of a tread portion progresses.

SUMMARY OF THE INVENTION

The present disclosure is directed to a tire including a tread portion. The tread portion includes at least one land portion. The land portion includes an outer region disposed inwardly of a tread surface in a tire radial direction, an inner region disposed inwardly of the outer region in the tire radial direction, and at least one sipe. The at least one sipe includes one outer sipe element extending in the outer region in a tire axial direction, and a plurality of inner sipe elements extending in the inner region. The plurality of inner sipe elements includes a component extending in a tire circumferential direction, and is connected to the outer sipe element.

In the tire of the present disclosure, the sipe includes one outer sipe element extending in the outer region in the tire axial direction, and the plurality of inner sipe elements extending in the inner region, and the plurality of inner sipe elements includes the component extending in the tire circumferential direction. Therefore, the component extending in the tire circumferential direction in the inner sipe element appears according to progress of wear. Thus, stiffness of the land portion in the tire axial direction is inhibited from becoming high, and excellent cornering performance on an ice/snow road surface and a wet road surface is maintained. Furthermore, an edge effect of the inner sipe element itself allows excellent cornering performance on an ice/snow road surface and a wet road surface to be obtained.

DETAILED DESCRIPTION

One embodiment of the present disclosure will be described below with reference to the drawings.

Figure 1:
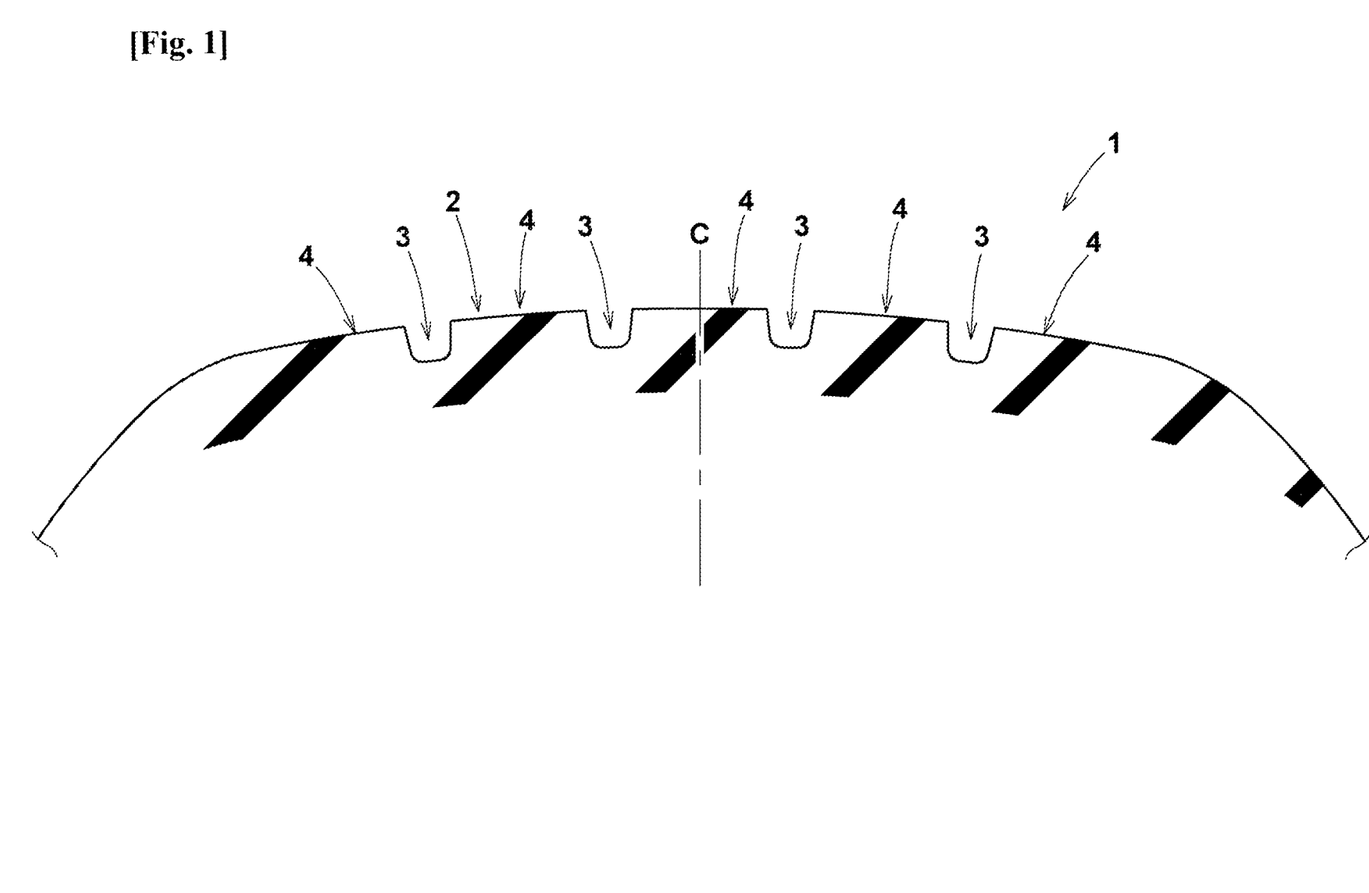
FIG. 1 is a transverse cross-sectional view of a tread portion of a tire according to one embodiment of the present disclosure.

FIG. 1 is a transverse cross-sectional view of a tread portion 2 of a tire 1 according to the present embodiment. FIG. 1 is a cross-sectional view of the tire 1 in a standardized state, including the tire rotation axis. In the present embodiment, the tread portion 2 is preferably used for, for example, a pneumatic tire. However, the tread portion 2 is not limited to such usage. The tread portion 2 may be used for, for example, an airless tire.

In the case of a pneumatic tire for which various standards are defined, the "standardized state" represents a state where the tire is mounted on a standardized rim and is inflated to a standardized internal pressure, and no load is applied to the tire. For tires for which various standards are not defined and airless tires, the standardized state represents a standard use state corresponding to a purpose of use of the tire under no load. In the description herein, unless otherwise specified, the dimensions and the like of components of the tire are represented by values measured in the standardized state. An ordinary tolerance for a rubber molded product is allowed for each component described herein.

In a standard system including a standard on which the tire is based, the "standardized rim" represents a rim that is defined by the standard for each tire, and is, for example, the "standardized rim" in the JATMA standard, the "Design Rim" in the TRA standard, or the "Measuring Rim" in the ETRTO standard.

In a standard system including a standard on which the tire is based, the "standardized internal pressure" represents an air pressure that is defined by the standard for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

As shown in FIG. 1, the tread portion 2 includes, for example, a plurality of main grooves 3 that continuously extends in the tire circumferential direction, and a plurality of land portions 4 demarcated by the main grooves 3. The tread portion 2 may be formed by a single land portion 4 without having the main grooves 3 formed in the tread portion 2.

In the present embodiment, the land portion 4 is formed as, for example, a block array including a plurality of blocks in the tire circumferential direction. The block is demarcated between a plurality of lateral grooves extending across the land portion 4 in the tire axial direction. In the present disclosure, the land portion 4 is not limited to such a structure, and may be, for example, formed in a rib-like shape that continuously extends in the tire circumferential direction.

Figure 2:
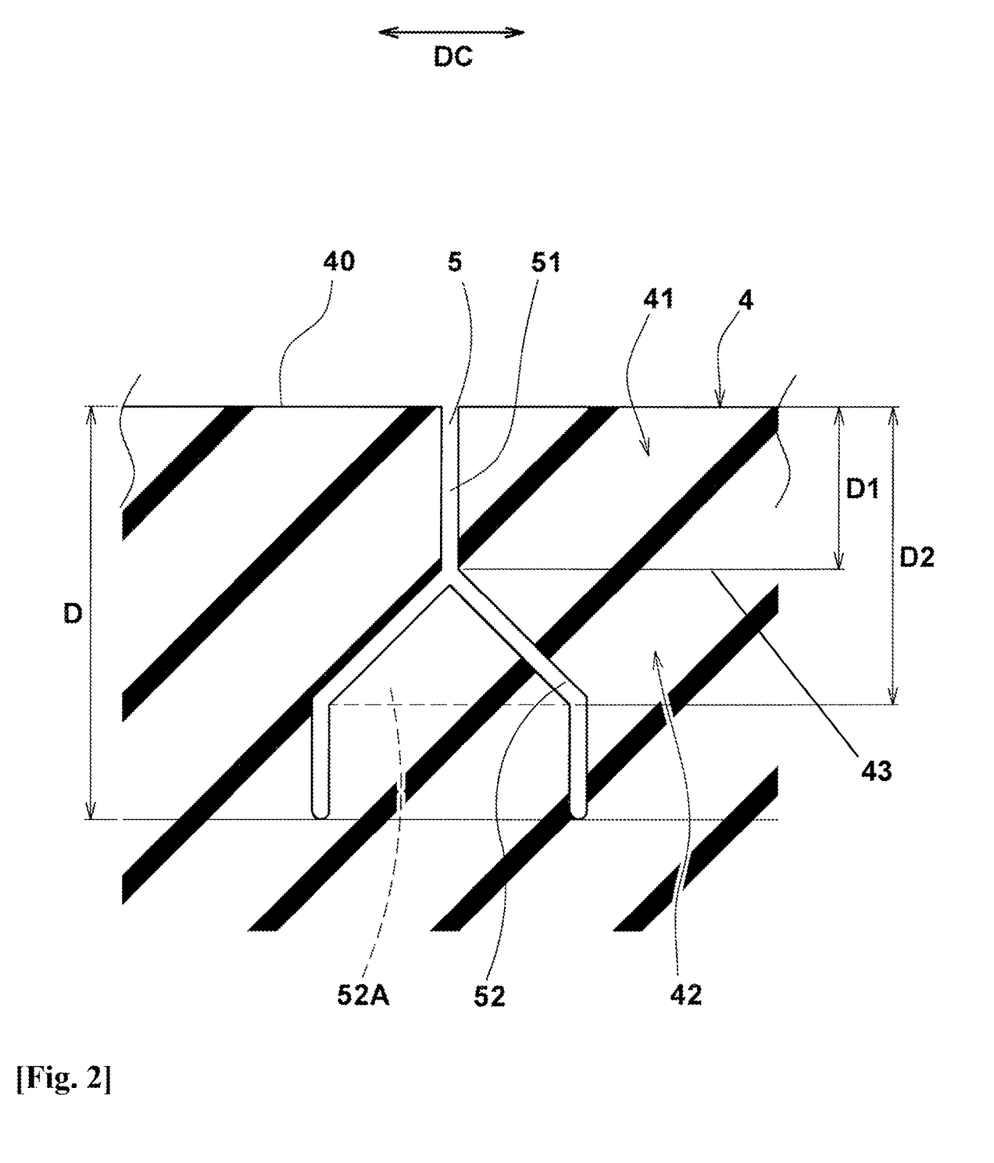
FIG. 2 is a cross-sectional view of a land portion in FIG. 1.

FIG. 2 shows a cross-section obtained by cutting the land portion 4 in a tire circumferential direction DC. The land portion 4 includes an outer region 41 and an inner region 42.

The outer region 41 is a region extending inwardly in the tire radial direction from a tread surface 40 over a first distance (depth) D1. The inner region 42 is disposed inwardly of the outer region 41 in the tire radial direction. A boundary 43 between the outer region 41 and the inner region 42 is distant from the tread surface 40 over the first distance D1 in the tire radially inward direction.

The outer region 41 serves as the tread surface 40 from a time when the tread portion 2 is new to an intermediate stage of wear. The inner region 42 serves as the tread surface 40 from the intermediate stage of wear of the tread portion 2 to an end stage of wear thereof.

The land portion 4 includes at least one sipe 5. In the present disclosure, the "sipe" represents a cut portion having a small width, and a width between two sipe walls opposing each other is not greater than 1.5 mm. An edge effect is exhibited by an edge at which the tread surface 40 and the sipe wall intersect each other to particularly enhance on-ice/snow performance and wet performance of the tire 1.

At least one land portion 4 may have at least one sipe 5. The sipe 5 is preferably disposed in each of the plurality of the land portions 4 (for example, all of the land portions 4 shown in FIG. 1).

The sipe 5 includes one outer sipe element 51 extending in the outer region 41 in the tire axial direction, and a plurality of inner sipe elements 52 extending in the inner region 42. A plurality of the sipes 5 each of which includes the outer sipe element 51 and the inner sipe elements 52 having such structures is preferably disposed in each of the land portions 4. However, the number of the sipes 5 formed in the land portion 4 may be at least one. Furthermore, each of the land portions 4 may include the sipe 5 and a sipe having a form other than the form of the sipe 5.

The outer sipe element 51 may be inclined relative to the tire axial direction. In this case, an angle of the outer sipe element 51 relative to the tire axial direction is preferably less than 45°. In a case where the angle of the outer sipe element 51 relative to the tire axial direction is less than 45°, acceleration/deceleration performance at an initial stage of wear is enhanced. The outer sipe element 51 is not limited to a linearly extending one, and may be curved or may zigzag. Moreover, the outer sipe element 51 may be inclined relative to the tire radial direction.

The plurality of inner sipe elements 52 is formed on the inner side in the tire radial direction so as to diverge from the outer sipe element 51 at the boundary 43 between the outer region 41 and the inner region 42. That is, the plurality of inner sipe elements 52 is connected to the outer sipe element 51 at the boundary 43.

At and after the intermediate stage of wear at which the inner region 42 serves as the tread surface 40, the plurality of inner sipe elements 52 appears at the tread surface 40. Thus, stiffness of the land portion 4 is inhibited from becoming high from the intermediate stage of wear to the end stage of wear. Furthermore, an edge component that exhibits the edge effect is increased, to obtain advantageous on-ice/snow performance and wet performance.

The inner sipe element 52 includes a component 52A extending in the tire circumferential direction DC. The "component extending in the tire circumferential direction DC" represents a component that is inclined relative to the tire axial direction or a component extending orthogonal to the tire axial direction, that is, a component that is not parallel to the tire axial direction.

The component 52A extending in the tire circumferential direction DC in the inner sipe element 52 appears at the tread surface 40 according to progress of wear. Thus, stiffness of the land portion 4 in the tire axial direction is inhibited from becoming high, to maintain excellent cornering performance on an ice/snow road surface and a wet road surface. Furthermore, by the edge effect exhibited by the component 52A itself of the inner sipe element 52, excellent cornering performance on an ice/snow road surface and a wet road surface is expected. In order to obtain excellent cornering performance on an ice/snow road surface and a wet road surface, an angle of the component 52A relative to the tire axial direction is preferably not less than 45°.

The component 52A is preferably not parallel to the outer sipe element 51. In a case where the component 52A is not parallel to the outer sipe element 51, a plurality of the inner sipe elements 52 having forms different from that of the outer sipe element 51 appears according to progress of wear, so that the degree of freedom of the inner sipe element 52 is enhanced, and more excellent cornering performance on an ice/snow road surface and a wet road surface is obtained.

The component 52A is preferably increased toward the inner side in the tire radial direction. In a case where the component 52A is increased toward the inner side in the tire radial direction, the component 52A appearing at the tread surface 40 is increased according to progress of wear, so that more excellent cornering performance on an ice/snow road surface and a wet road surface is obtained from the intermediate stage of wear to the end stage of wear.

Figure 3:
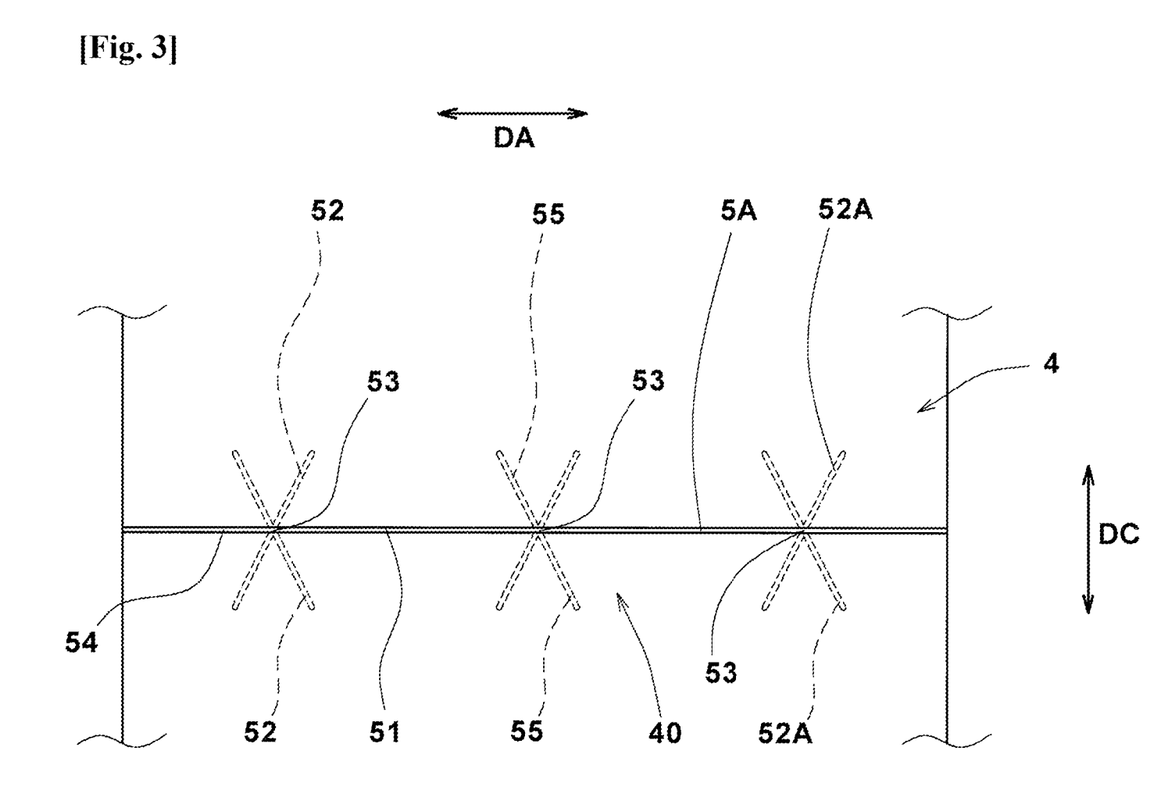
FIG. 3 is a development of a land portion and illustrates a sipe as one form of a sipe in FIG. 2.

FIG. 3 is a development of the land portion 4 and illustrates a sipe 5A as one form of the sipe 5. In FIG. 3, the outer sipe element 51 is indicated by a solid line, and the inner sipe element 52 is indicated by a dashed line.

In FIG. 3, the sipe 5A is formed as a so-called open sipe that reaches both ends of the land portion 4 in a tire axial direction DA. The sipe 5A may be formed as a so-called semi-open sipe that reaches one end of the land portion 4 in the tire axial direction DA, or formed as a so-called closed sipe having both ends in the tire axial direction DA inside the land portion 4. The same applies to sipes 5B and 5C described below.

In the sipe 5A, the plurality of inner sipe elements 52 includes an element 54 extending from an originating point 53 connected to the outer sipe element 51 so as to be coplanar with the outer sipe element 51, and elements 55 that are extended in a radial manner from the originating point 53 connected to the outer sipe element 51. The sipe 5A having such a structure allows the component 52A extending in the tire circumferential direction DC relative to the element 54 to be increased from the intermediate stage of wear to the end stage of wear, and excellent cornering performance on an ice/snow road surface and a wet road surface is expected.

In the sipe 5A, the plurality of inner sipe elements 52 may be separate from each other, or may be connected to each other through the element 54 extending so as to be coplanar with the outer sipe element 51.

Figure 4:
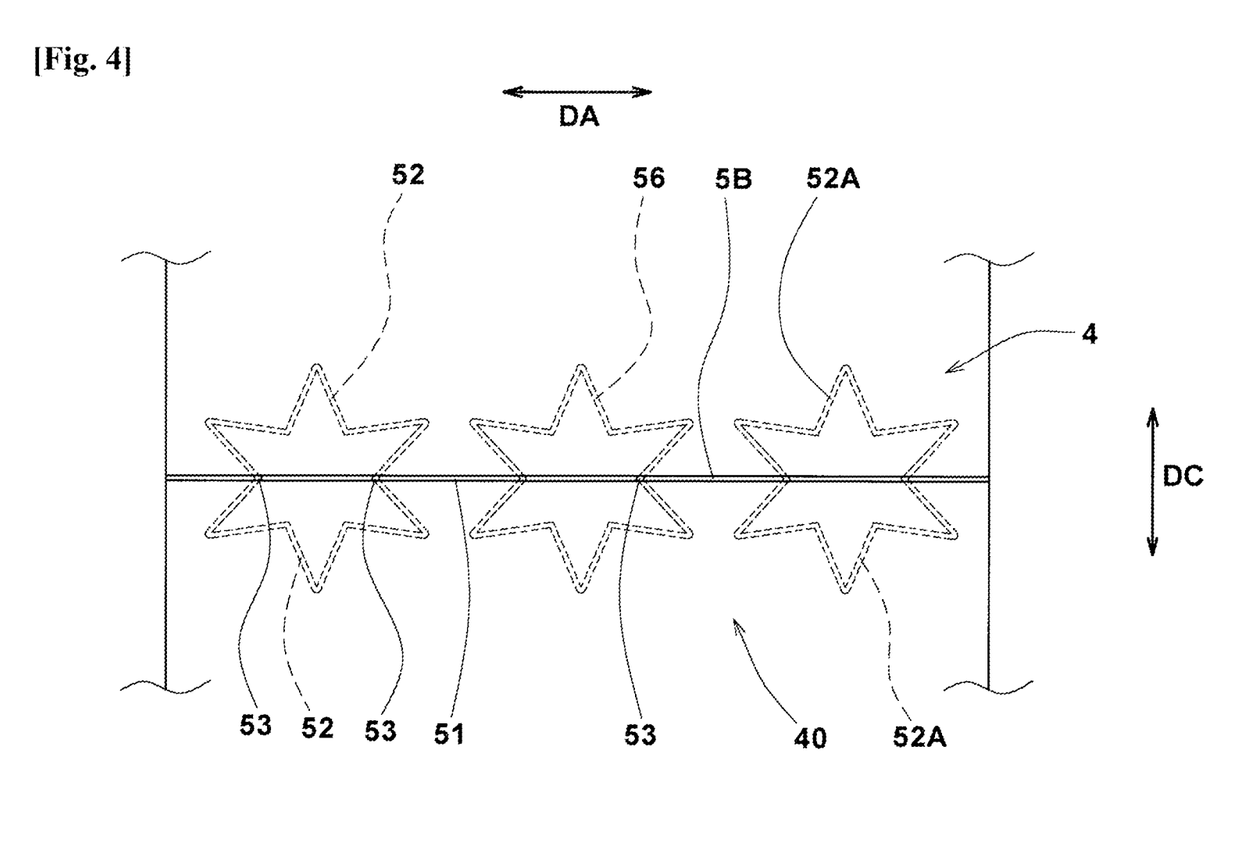
FIG. 4 is a development of a land portion and illustrates a sipe as another form of the sipe in FIG. 2.

FIG. 4 is a development of the land portion 4 and illustrates a sipe 5B as another form of the sipe 5. In FIG. 4, the outer sipe element 51 is indicated by a solid line, and the inner sipe element 52 is indicated by a dashed line.

In the sipe 5B, the plurality of inner sipe elements 52 includes a closed element 56 formed so as to go around from the originating point 53 connected to the outer sipe element 51. The sipe 5B having such a structure allows the component 52A extending in the tire circumferential direction DC in the element 56 to be increased from the intermediate stage of wear to the end stage of wear, and excellent cornering performance on an ice/snow road surface and a wet road surface is expected.

The element 56 is preferably formed in a polygonal shape (dodecagon in FIG. 4) as viewed in the tire radial direction. The polygonal shape may be a star-like shape that has interior angles such that acute angles and obtuse angles alternate. The sipe 5B having such a structure allows the component 52A extending in the tire circumferential direction DC in the element 56 to be further increased from the intermediate stage of wear to the end stage of wear.

In the sipe 5B, the plurality of inner sipe elements 52 may be separate from each other, or may be connected to each other through the element 54 (see FIG. 3) extending so as to be coplanar with the outer sipe element 51.

Moreover, in the tread portion 2, both the sipe 5A and the sipe 5B may be formed in one land portion 4.

Figure 5:
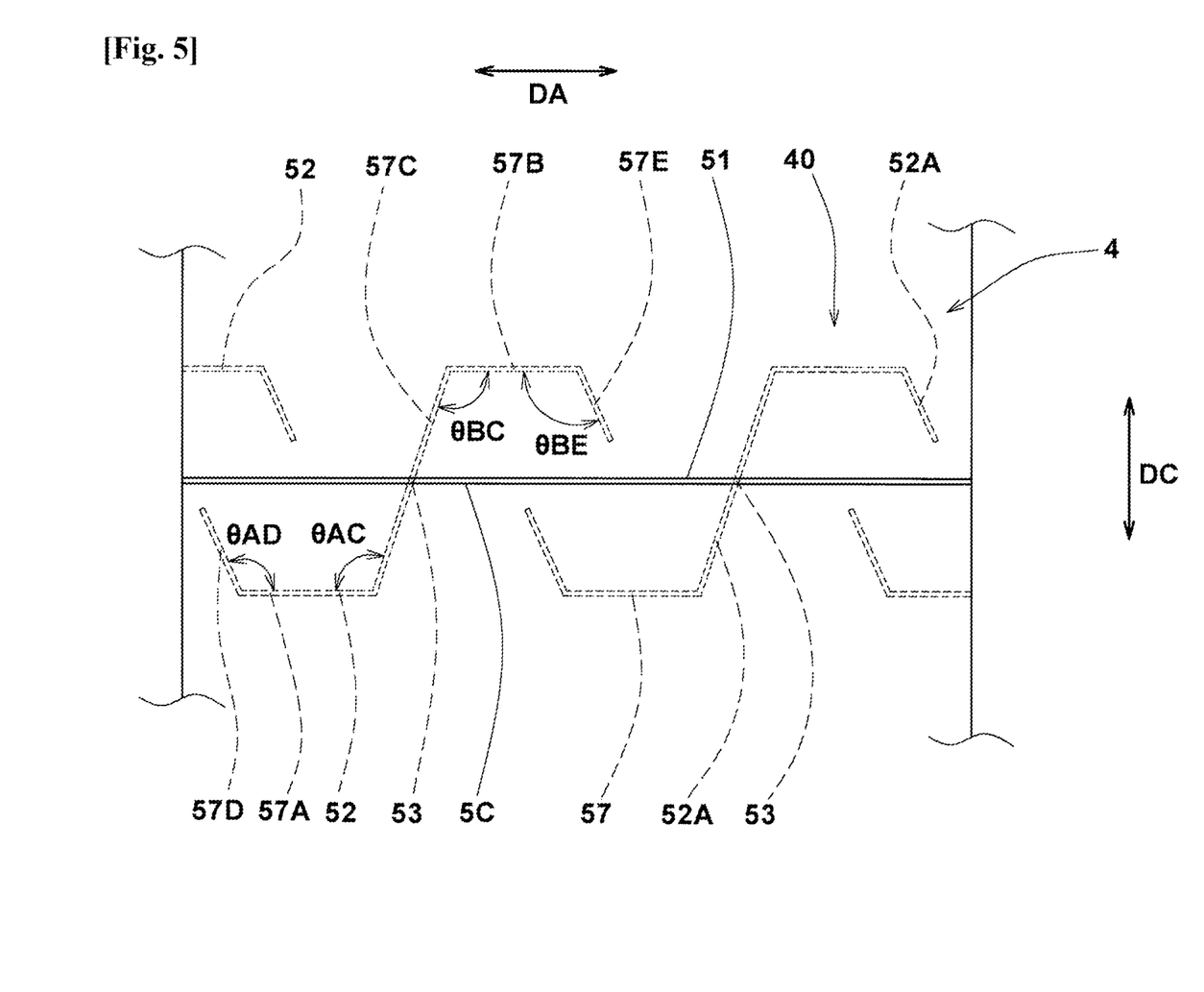
FIG. 5 is a development of a land portion and illustrates a sipe as still another form of the sipe in FIG. 2.

FIG. 5 is a development of the land portion 4 and illustrates a sipe 5C as still another form of the sipe 5. In FIG. 5, the outer sipe element 51 is indicated by a solid line, and the inner sipe element 52 is indicated by a dashed line.

In the sipe 5C, the plurality of inner sipe elements 52 includes a plurality of bent elements 57.

The plurality of bent elements 57 each include a first offset element 57A, a second offset element 57B, and a joint element 57C.

The first offset element 57A is offset toward one side relative to the outer sipe element 51 in the tire circumferential direction DC, and extends in the tire axial direction DA.

The second offset element 57B is offset toward the other side relative to the outer sipe element 51 in the tire circumferential direction DC, and extends in the tire axial direction DA. The first offset element 57A and the second offset element 57B are offset in opposite sides, respectively, in the tire circumferential direction DC.

The joint element 57C connects between the first offset element 57A and the second offset element 57B. The joint element 57C extends from one side toward the other side in the tire circumferential direction DC, and forms the component 52A extending in the tire circumferential direction DC in the bent element 57.

The bent element 57 including the joint element 57C as the component 52A extending in the tire circumferential direction DC allows excellent cornering performance on an ice/snow road surface and a wet road surface to be obtained from the intermediate stage of wear to the end stage of wear.

The plurality of bent elements 57 are separate from each other. Thus, stiffness of the land portion 4 is inhibited from becoming excessively low, and excellent steering stability on a dry road surface is obtained.

In the present disclosure, the joint element 57C is preferably inclined relative to the tire circumferential direction DC. The joint element 57C having such a structure forms a component extending in the tire axial direction DA in the inner sipe element 52. Thus, excellent acceleration/deceleration performance on an ice/snow road surface and a wet road surface is obtained from the intermediate stage of wear to the end stage of wear.

In the bent elements 57 adjacent to each other in the tire axial direction DA, at least a part of the first offset element 57A of one of the bent elements 57 opposes at least a part of the second offset element 57B of the other of the bent elements 57 in the tire circumferential direction DC. Thus, the density of the bent elements 57 is locally increased, and excellent acceleration/deceleration performance on an ice/snow road surface and a wet road surface is obtained from the intermediate stage of wear to the end stage of wear.

In the present disclosure, in each of the plurality of bent elements 57, the first offset element 57A preferably includes a first terminating element 57D, at an end portion on the side opposite to the side connecting to the joint element 57C. The first terminating element 57D extends toward the second offset element 57B of the adjacent bent element 57. The first terminating element 57D extends so as to be inclined relative to the tire circumferential direction DC in the direction opposite to the direction of the joint element 57C. The first terminating element 57D having such a structure forms a key-like shape together with the first offset element 57A and the joint element 57C, and an excellent edge effect is exhibited and excellent acceleration/deceleration performance and cornering performance on an ice/snow road surface and a wet road surface are obtained from the intermediate stage of wear to the end stage of wear.

In the present disclosure, in each of the plurality of bent elements 57, the second offset element 57B preferably includes a second terminating element 57E, at an end portion on the side opposite to the side connecting to the joint element 57C. The second terminating element 57E extends toward the first offset element 57A of the adjacent bent element 57. The second terminating element 57E extends so as to be inclined relative to the tire circumferential direction DC in the direction opposite to the direction of the joint element 57C. The second terminating element 57E having such a structure forms a key-like shape together with the second offset element 57B and the joint element 57C, and an excellent edge effect is exhibited and excellent acceleration/deceleration performance and cornering performance on an ice/snow road surface and a wet road surface are obtained from the intermediate stage of wear to the end stage of wear.

Among the plurality of bent elements 57, preferably, the bent elements 57 adjacent to each other in the tire circumferential direction DC partially overlap each other in the tire axial direction DA. In the present disclosure, a part of the first offset element 57A and the first terminating element 57D, and a part of the second offset element 57B and the second terminating element 57E overlap each other in the tire axial direction DA. The bent elements 57 having such a structure allow the density of the bent elements 57 to be locally increased, and excellent acceleration/deceleration performance on an ice/snow road surface and a wet road surface is obtained from the intermediate stage of wear to the end stage of wear.

Figure 6:
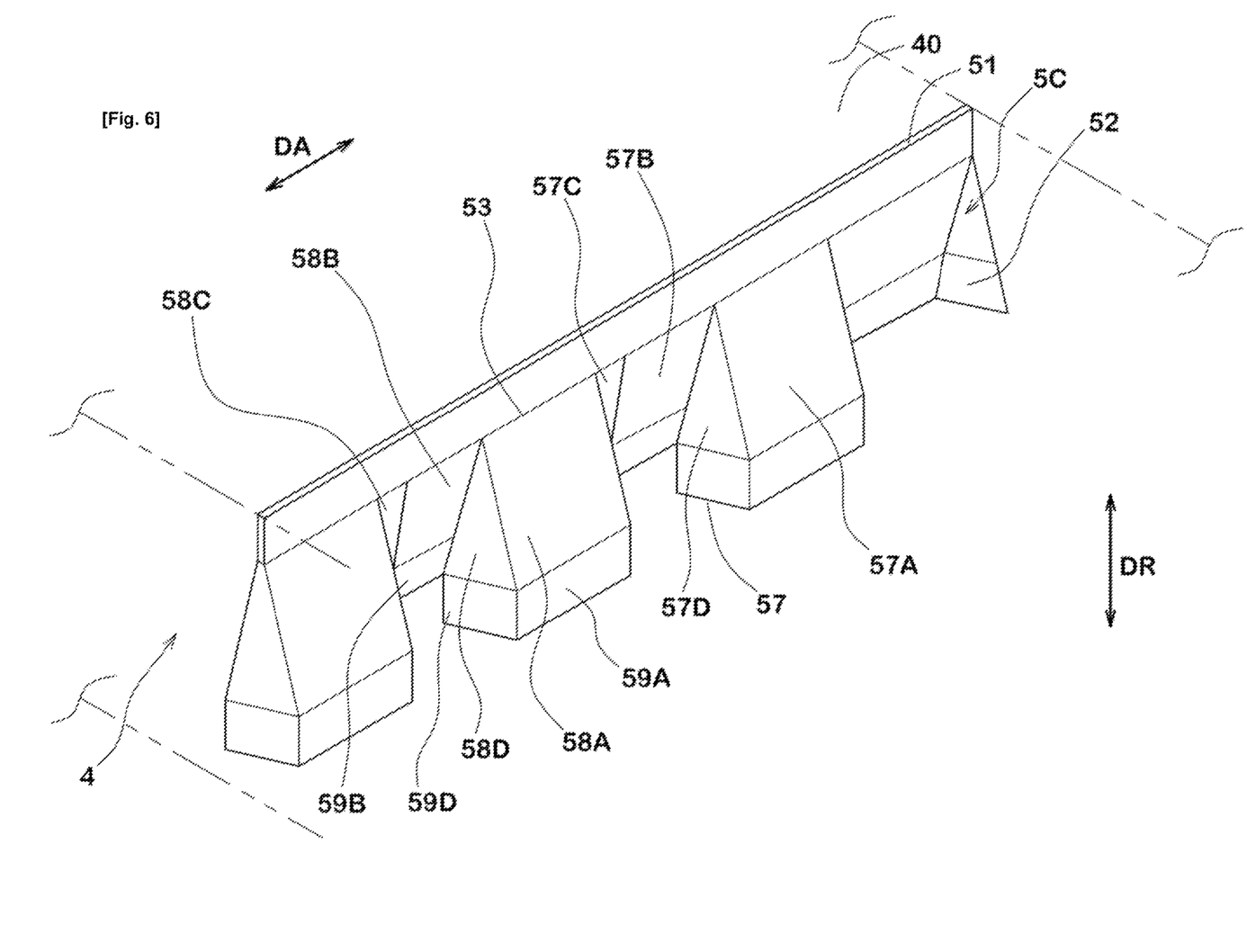
FIG. 6 is a perspective view of the land portion and illustrates the sipe in FIG. 5 as viewed through the land portion from the outer side in the tire radial direction.
Figure 7:
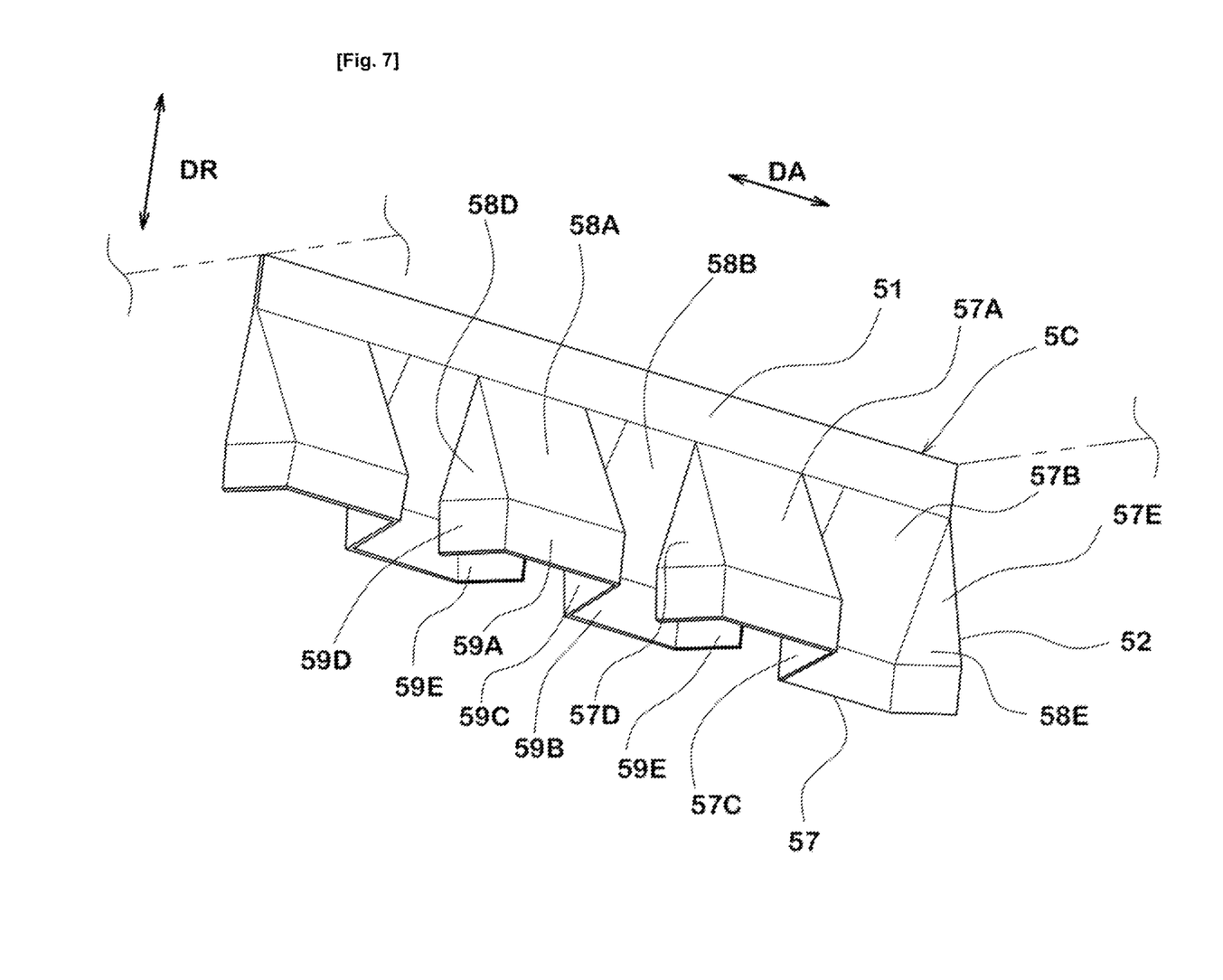
FIG. 7 is a perspective view of the land portion and illustrates the sipe in FIG. 5 as viewed through the land portion from the inner side in the tire radial direction.

FIGS. 6 and 7 are each a perspective view of the sipe 5C as viewed through the land portion 4. In FIGS. 6 and 7, the contour of the land portion 4 is indicated by an alternate long and two short dashes line, and the contour of the sipe 5C is indicated by a solid line.

In the sipe 5C, the first offset element 57A has an inclined element 58A that is inclined relative to a tire radial direction DR. The second offset element 57B has an inclined element 58B that is inclined relative to the tire radial direction DR. Similarly, the joint element 57C, the first terminating element 57D, and the second terminating element 57E have inclined elements 58C, 58D, and 58E, respectively, which are inclined relative to the tire radial direction DR. The inclined elements 58A, 58B, 58C, 58D, and 58E are disposed on the outer side in the tire radial direction DR in the inner sipe element 52, and are connected to the outer sipe element 51.

The inclined elements 58A, 58B allow the offsets of the first offset element 57A and the second offset element 57B to be increased according to progress of wear, and allow a distance between the first offset element 57A and the second offset element 57B to be increased. The inclined elements 58C, 58D, and 58E allow the lengths of the joint element 57C, the first terminating element 57D, and the second terminating element 57E to be increased according to progress of wear. Thus, the component 52A extending in the tire circumferential direction DC in the inner sipe element 52 is increased, and excellent cornering performance on an ice/snow road surface and a wet road surface is obtained from the intermediate stage of wear to the end stage of wear.

In the sipe 5C, the first offset element 57A has a parallel element 59A that is bent from the inclined element 58A and is parallel to the tire radial direction DR. The second offset element 57B has a parallel element 59B that is bent from the inclined element 58B and is parallel to the tire radial direction DR. Similarly, the joint element 57C, the first terminating element 57D, and the second terminating element 57E have parallel elements 59C, 59D, and 59E that are parallel to the tire radial direction DR. The parallel elements 59A, 59B, 59C, 59D, and 59E are disposed on the inner side in the tire radial direction DR in the inner sipe element 52, and are connected to the inclined elements 58A, 58B, 58C, 58D, and 58E, respectively.

In a case where the parallel elements 59A, 59B, 59C, 59D, and 59E are disposed on the inner side in the tire radial direction DR in the inner sipe element 52, the tread portion 2 can be easily demolded from a vulcanization mold after the tire 1 has been vulcanized and molded while a sufficient depth of the inner sipe element 52 is assured. Thus, for example, damage to a blade disposed in a vulcanization mold for forming the sipe 5C and rubber of the tread portion 2 is reduced.

In the sipe 5C, in the inner sipe element 52, a ratio X/Y of the total X of the lengths of the components 52A extending in the tire circumferential direction DC, relative to the total Y of the lengths of the components extending in the tire axial direction DA is preferably 0.3 to 0.7. The length of the component extending in the tire axial direction DA and the length of the component 52A extending in the tire circumferential direction DC are each measured at the inner ends, in the tire radial direction DR, of the inclined elements 58A, 58B, 58C, 58D, and 58E.

In a case where the ratio X/Y is not less than 0.3, excellent cornering performance on an ice/snow road surface and a wet road surface is obtained from the intermediate stage of wear to the end stage of wear. In a case where the ratio X/Y is not greater than 0.7, sufficient stiffness, in the tire axial direction DA, of the land portion 4 is assured from the intermediate stage of wear to the end stage of wear. Therefore, an actual ground contact area is inhibited from being reduced according to deformation of the land portion 4, and excellent cornering performance on an ice/snow road surface and a wet road surface, and a dry road surface is obtained.

As shown in FIG. 5, an angle θAD between the first offset element 57A and the first terminating element 57D is preferably 90° to 130°.

In a case where the angle θAD is not less than 90°, the inner sipe element 52 having a key-like shape is formed by the first terminating element 57D, the first offset element 57A, and the joint element 57C, and excellent acceleration/deceleration performance and cornering performance on an ice/snow road surface and a wet road surface are obtained at and after the intermediate stage of wear. A distance between the first terminating element 57D and the second terminating element 57E opposing each other is sufficiently obtained, and sufficient stiffness, in the tire axial direction DA, of the land portion 4 is assured from the intermediate stage of wear to the end stage of wear. In a case where the angle θAD is not greater than 130°, the component 52A extending in the tire circumferential direction DC in the first terminating element 57D is easily increased.

Similarly, an angle θBE between the second offset element 57B and the second terminating element 57E is preferably 90° to 130°. Each of an angle θAC between the first offset element 57A and the joint element 57C, and an angle θBC between the second offset element 57B and the joint element 57C is preferably 90° to 130°.

Figure 8:
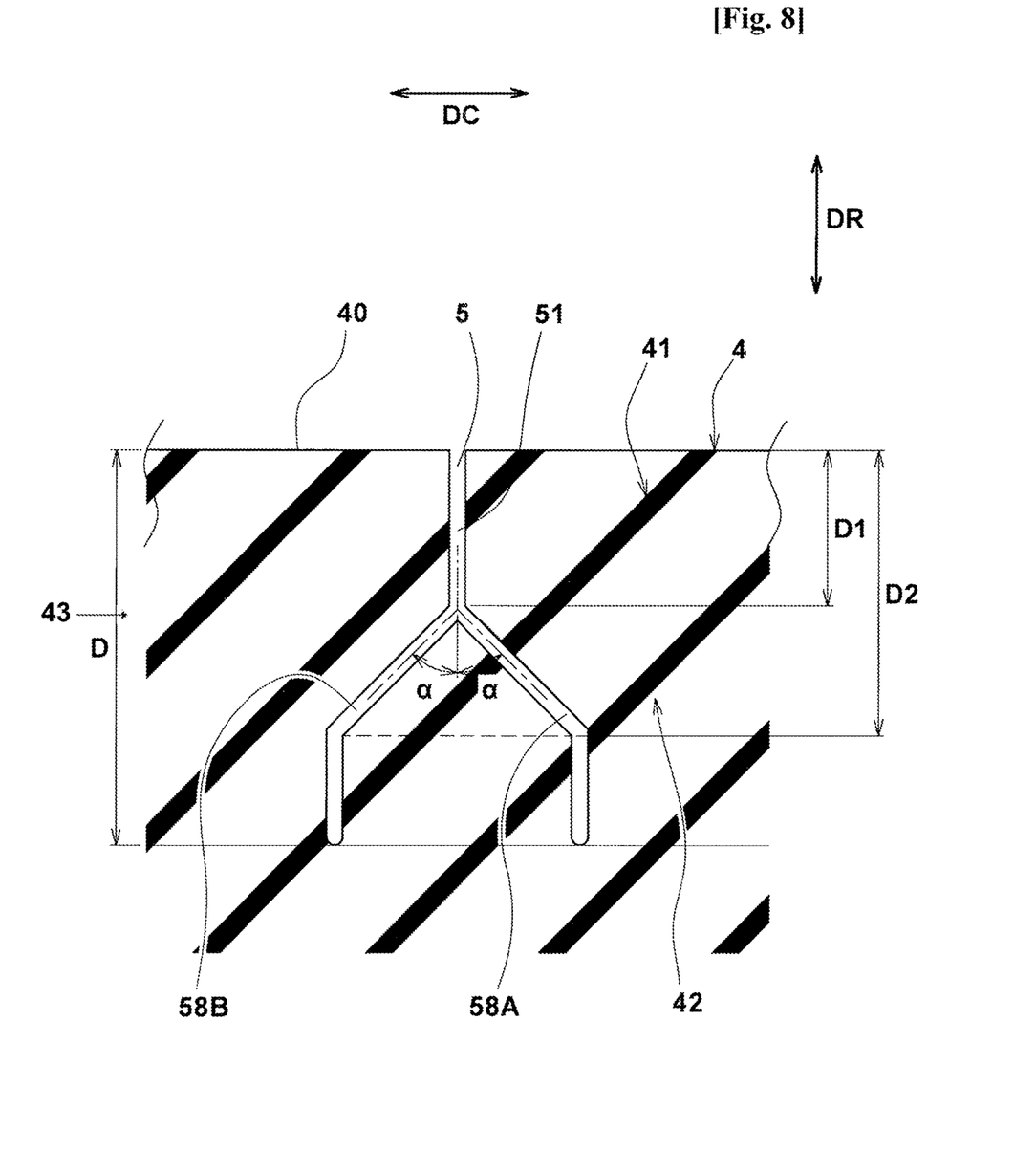
FIG. 8 is a cross-sectional view of the land portion including the sipe in FIG. 5.

FIG. 8 shows a cross-section obtained by cutting the land portion 4 including the sipe 5C in the tire circumferential direction DC. A ratio D1/D of a depth D1 of the outer region 41 from the tread surface 40, relative to the entire depth D of the sipe 5C is preferably not greater than 20%. In such a configuration, the inner sipe element 52 diverging from the outer region 41 appears early at the tread surface 40, and excellent cornering performance and acceleration/deceleration performance on an ice/snow road surface and a wet road surface are obtained.

A ratio D2/D of a depth D2 of each of the inclined elements 58A, 58B, 58C, 58D, and 58E from the tread surface 40, relative to the entire depth D of the sipe 5C is preferably not greater than 95%. In such a configuration, a distance between the first offset element 57A and the second offset element 57B is increased at the end stage of wear, and the length of each of the joint element 57C, the first terminating element 57D, and the second terminating element 57E is increased. Thus, the component 52A extending in the tire circumferential direction DC in the inner sipe element 52 is increased, and excellent cornering performance on an ice/snow road surface and a wet road surface is obtained at the end stage of wear.

An angle α of each of the inclined elements 58A, 58B, 58C, 58D, and 58E relative to the tire radial direction DR is preferably not greater than 45°. In a case where the angle α is not greater than 45°, a distance between the parallel elements 59A and 59B is inhibited from being excessively increased, and the number of the sipes 5C can be increased in the tire circumferential direction DC. The angle α is greater than 0°.

Although the tire 1 of the present disclosure has been described above in detail, the present disclosure is not limited to the above-described specific embodiment, and various modifications can be made.

APPENDIX

The present disclosure includes the following aspects.

[Disclosure 1]

A tire including a tread portion, in which
the tread portion includes at least one land portion,
the land portion includes an outer region disposed inwardly of a tread surface in a tire radial direction, an inner region disposed inwardly of the outer region in the tire radial direction, and at least one sipe,
the at least one sipe includes one outer sipe element extending in the outer region in a tire axial direction, and a plurality of inner sipe elements extending in the inner region, and
the plurality of inner sipe elements includes a component extending in a tire circumferential direction, and is connected to the outer sipe element.

[Disclosure 2]

In the tire according to disclosure 1, the component extending in the tire circumferential direction is not parallel to the outer sipe element.

[Disclosure 3]

In the tire according to disclosure 1 or 2, the component extending in the tire circumferential direction is increased inwardly in the tire radial direction.

[Disclosure 4]

In the tire according to any one of disclosures 1 to 3,
the plurality of inner sipe elements includes a plurality of bent elements, and
each of the plurality of bent elements includes
a first offset element that is offset toward one side relative to the outer sipe element in the tire circumferential direction and that extends in the tire axial direction,
a second offset element that is offset toward another side relative to the outer sipe element in the tire circumferential direction and that extends in the tire axial direction, and
a joint element connecting between at least one of the first offset elements and at least one of the second offset elements.

[Disclosure 5]

In the tire according to disclosure 4, the joint element is inclined relative to the tire circumferential direction.

[Disclosure 6]

In the tire according to disclosure 5,
in each of the plurality of bent elements,
the first offset element includes a first terminating element extending toward the second offset element so as to be inclined relative to the tire circumferential direction in a direction opposite to a direction of the joint element, at an end portion on a side opposite to a side connecting to the joint element.

[Disclosure 7]

In the tire according to disclosure 6,
in each of the plurality of bent elements,
the second offset element includes a second terminating element extending toward the first offset element so as to be inclined relative to the tire circumferential direction in a direction opposite to the direction of the joint element, at an end portion on a side opposite to a side connecting to the joint element.

[Disclosure 8]

In the tire according to disclosure 7, among the plurality of bent elements, bent elements adjacent to each other in the tire circumferential direction partially overlap each other in the tire axial direction.

[Disclosure 9]

In the tire according to any one of disclosures 4 to 8, the first offset element and the second offset element each have an inclined element that is inclined relative to the tire radial direction.

[Disclosure 10]

In the tire according to disclosure 9, the first offset element and the second offset element each have a parallel element that is bent from the inclined element and is parallel to the tire radial direction.

[Disclosure 11]

In the tire according to disclosure 9 or 10, at an inner end of the inclined element in the tire radial direction, a ratio X/Y of a total X of lengths of the components extending in the tire circumferential direction, relative to a total Y of lengths of components extending in the tire axial direction is 0.3 to 0.7 in the inner sipe elements.

[Disclosure 12]

In the tire according to any one of disclosures 1 to 3, the plurality of inner sipe elements includes an element that is extended in a radial manner from an originating point connected to the outer sipe element.

[Disclosure 13]

In the tire according to any one of disclosures 1 to 3, the plurality of inner sipe elements includes a closed element formed so as to go around from an originating point connected to the outer sipe element.

[Disclosure 14]

In the tire according to disclosure 1, 12, or 13, the plurality of inner sipe elements includes a plurality of elements that are separate from each other.

What is claimed is:

1. A tire comprising:
a tread portion,
wherein the tread portion comprises at least one land portion,
wherein the land portion comprises an outer region disposed inwardly of a tread surface in a tire radial direction, an inner region disposed inwardly of the outer region in the tire radial direction, and at least one sipe,
wherein the at least one sipe comprises one outer sipe element extending in the outer region in a tire axial direction, and a plurality of inner sipe elements extending in the inner region,
wherein the plurality of inner sipe elements comprises a component extending in a tire circumferential direction, and is connected to the outer sipe element,
wherein the plurality of inner sipe elements comprises a plurality of bent elements, and
wherein each of the plurality of bent elements comprises:
a first offset element that is offset toward one side relative to the outer sipe element in the tire circumferential direction and that extends in the tire axial direction, a second offset element that is offset toward another side relative to the outer sipe element in the tire circumferential direction and that extends in the tire axial direction, and a joint element connecting between at least one of the first offset elements and at least one of the second offset elements, wherein the joint element is inclined relative to the tire circumferential direction, wherein in each of the plurality of bent elements:

the first offset element comprises a first terminating element extending toward the second offset element so as to be inclined relative to the tire circumferential direction in a direction opposite to a direction of the joint element, at an end portion on a side opposite to a side connecting to the joint element, and the second offset element comprises a second terminating element extending toward the first offset element so as to be inclined relative to the tire circumferential direction in a direction opposite to the direction of the joint element, at an end portion on a side opposite to a side connecting to the joint element, and wherein the plurality of bent elements are separate from each other and bent elements adjacent to each other in the tire circumferential direction partially overlap each other in the tire axial direction.

2. The tire according to claim 1, wherein the component extending in the tire circumferential direction is not parallel to the outer sipe element.

3. The tire according to claim 1, wherein the component extending in the tire circumferential direction is increased inwardly in the tire radial direction.

4. The tire according to claim 1, wherein the first offset element and the second offset element each have an inclined element that is inclined relative to the tire radial direction.

5. The tire according to claim 4, wherein the first offset element and the second offset element each have a parallel element that is bent from the inclined element and is parallel to the tire radial direction.

6. The tire according to claim 4, wherein, at an inner end of the inclined element in the tire radial direction, a ratio X/Y of a total X of lengths of the components extending in the tire circumferential direction, relative to a total Y of lengths of components extending in the tire axial direction is 0.3 to 0.7 in the inner sipe elements.

7. The tire according to claim 4, wherein a ratio of a depth of each of the inclined elements from the tread surface, relative to a depth of the outer region and the inner region, is less than 95%.

8. The tire according to claim 4, wherein an angle of each of the inclined elements relative to the tire radial direction is less than 45°.

9. The tire according to claim 1, wherein the plurality of inner sipe elements comprises a plurality of elements that extend in a radial manner from a respective one of a plurality of originating points connected to the outer sipe element, and the plurality of originating points are uniformly spaced apart from each other in the tire axial direction.

10. The tire according to claim 1, wherein an angle between the first offset element and the first terminating element is greater than 90° and less than 130°, an angle between the second offset element and the second terminating element is greater than 90° and less than 130°, an angle between the first offset element and the joint element is greater than 90° and less than 130°, and an angle between the second offset element and the joint element is greater than 90° and less than 130°.

11. The tire according to claim 1, wherein a ratio of a depth of the outer region from the tread surface, relative to a depth of the outer region and the inner region, is less than 20%.

* * * * *